April 28, 1925.
C. B. COOK
1,535,203
METHOD AND APPARATUS FOR HANDLING FREIGHT
Filed March 12, 1923   3 Sheets-Sheet 3
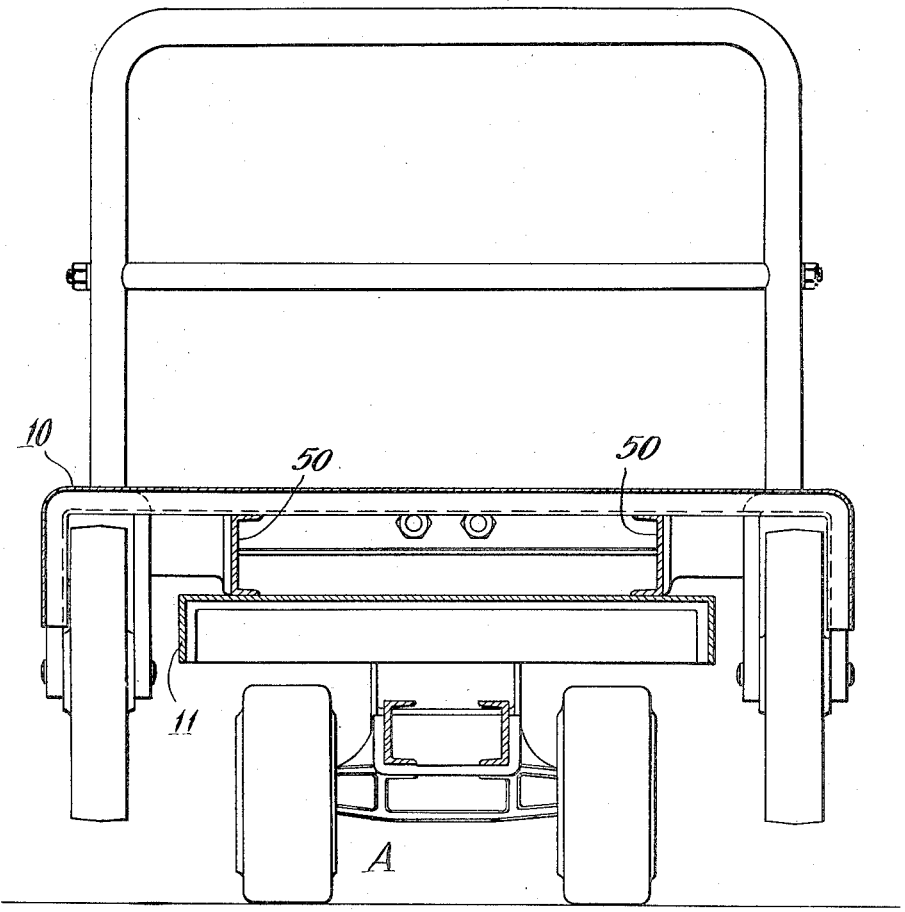
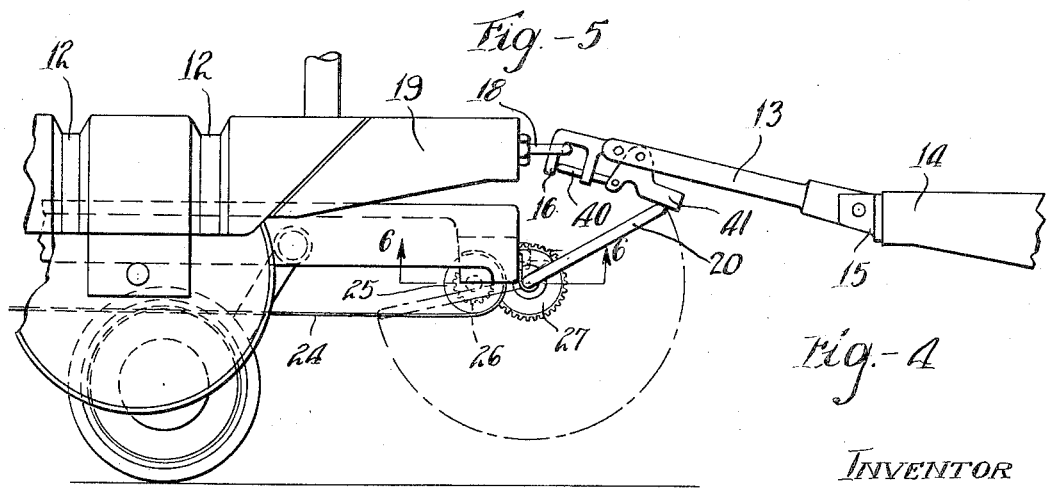
INVENTOR
Cleo Brenton Cook
BY Baker & Macklin
ATTYS.

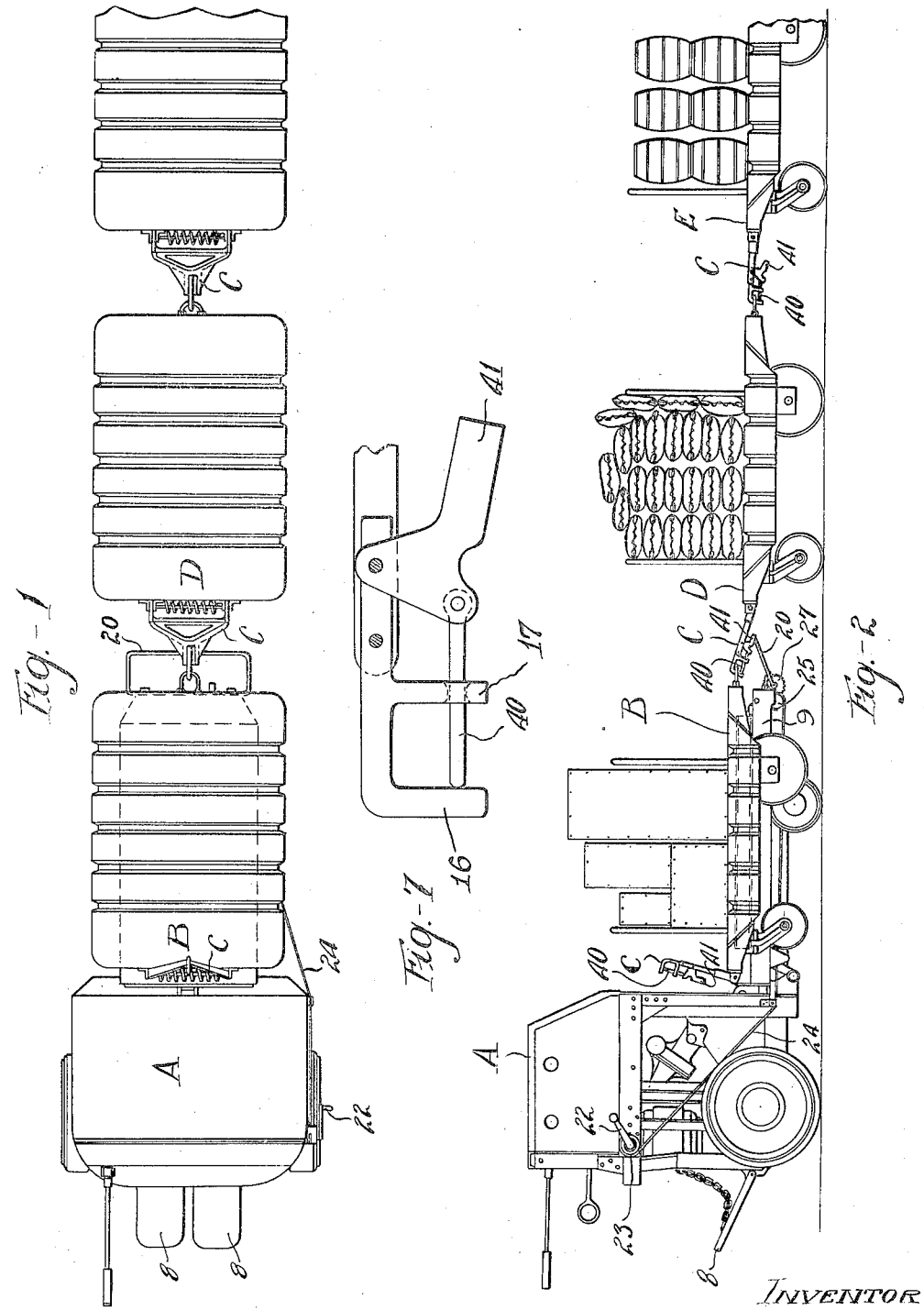

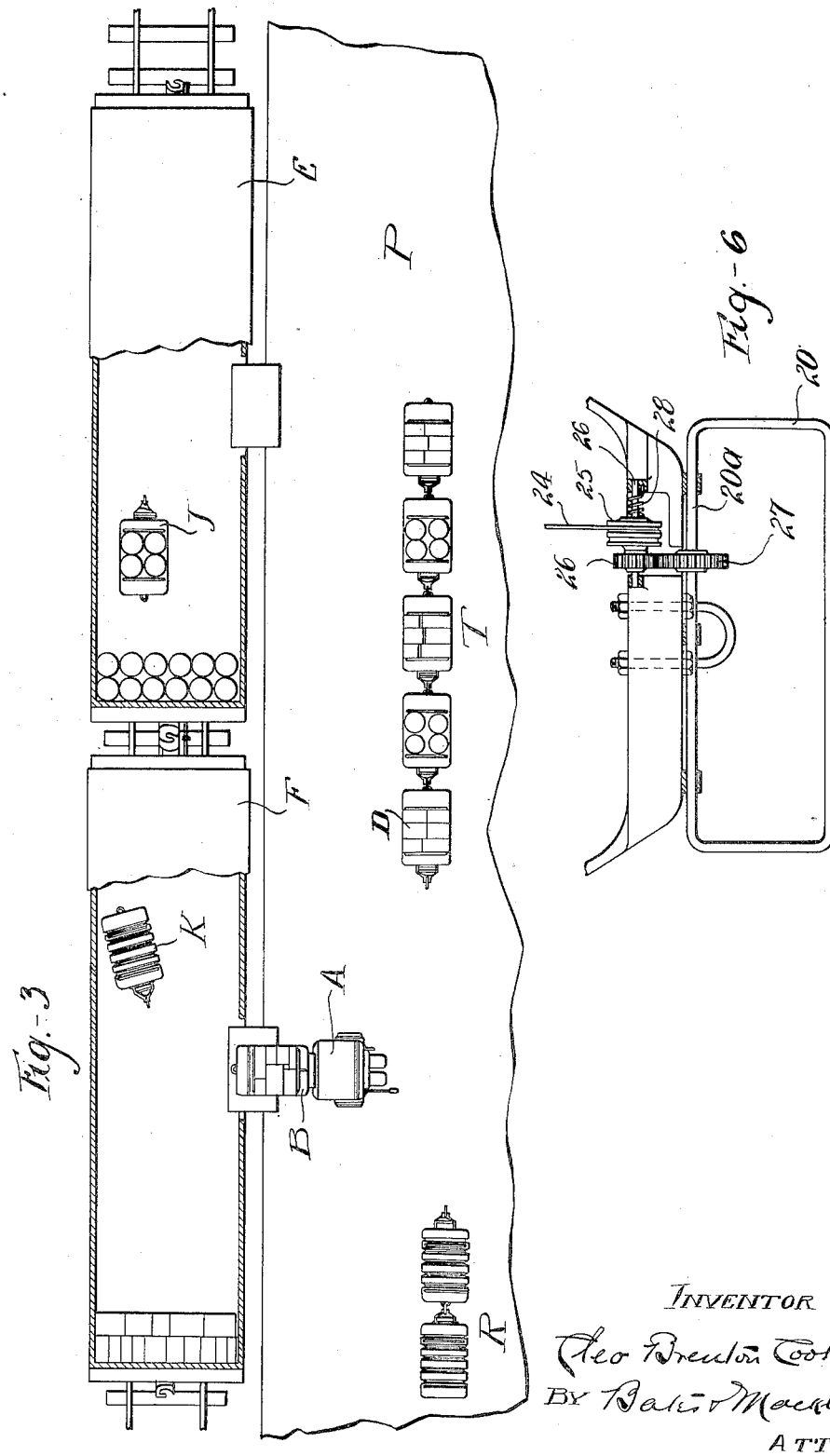

Patented Apr. 28, 1925.

1,535,203

UNITED STATES PATENT OFFICE.

CLEO BRENTON COOK, OF EAST CLEVELAND, OHIO, ASSIGNOR TO THE ELWELL-PARKER ELECTRIC COMPANY, OF CLEVELAND, OHIO, A CORPORATION OF OHIO.

METHOD AND APPARATUS FOR HANDLING FREIGHT.

Application filed March 12, 1923. Serial No. 624,582.

*To all whom it may concern:*

Be it known that I, CLEO BRENTON COOK, a citizen of the United States, residing at East Cleveland, in the county of Cuyahoga and State of Ohio, have invented a certain new and useful Improvement in a Method and Apparatus for Handling Freight, of which the following is a full, clear, and exact description, reference being had to the accompanying drawings.

This invention is concerned with the loading and unloading of merchandise to and from freight cars, and has for its object the provision of a economical and effective method for handling that class of freight which requires shipment in closed cars.

More specifically, my invention is concerned with a system and apparatus for carrying out the operations of handling freight of less than carload lots, at railway termini, warehouses and shipping and receiving departments of large manufacturing plants by the use of an industrial truck of the elevating platform type and trailer trains, and whereby I am enabled to accomplish more rapid and efficient handling than by methods and apparatus heretofore employed.

Other objects will become apparent from the following description, taken in connection with the accompanying drawings, and the essential features will be summarized in the claims.

For convenience in illustrating my invention, I show in Fig. 1, a plan view of a truck and a trailer train associated therewith; Fig. 2 is a side elevational view of the train when loaded; Fig. 3 is a diagrammatic representation of a shipping terminal including a freight loading platform; Fig. 4 is a fragmentary side elevation of the coupling ends of a truck and an adjacent trailer and showing means for coupling a trailer train to the truck; Fig. 5 is an elevation looking at the coupling end of the truck and showing a trailer superposed on the truck, the rear end of the trailer being shown in cross section; Fig. 6 is an end elevation of a trailer coupling and uncoupling mechanism associated with the rear end of the truck; and Fig. 7 is an enlarged view of the coupling mechanism.

My invention contemplates the use of a self-propelled vehicle of the self loading industrial truck type, wherein there is a low slung load engaging platform, disposed at the rearward end of the truck and a plurality of load supporting platforms mounted on wheels to facilitate the movement of the load, and whereby the loads positioned thereon may be shifted from place to place in the form of a trailer train. The arrangement of the trailer platforms and the load engaging platform on the motor truck are preferably such that the trailer truck may be automatically lifted from the floor by the load engaging platform of the motor truck, while maintaining the lifted trailer in coupled relation to a series of such trailers mounted on wheels, the arrangement of the wheels on the trailer being such as to permit easy maneuvering of the trailer train by the motor truck.

To facilitate the manipulation of the truck and the particular trailer disposed upon the motor truck when uncoupled from the train, I provide a coupling mechanism which may be disengaged by mechanism carried by the motor truck and operable from the driver's position on the motor truck, the coupling mechanism being common on all of the trailers and arranged to automatically swing upwardly whereby the trailer may be readily engaged by the motor truck without necessitating the operator thereof, leaving the driving position on the motor truck. The relation of the trailer platform and wheels therefor, to the load engaging platform of the truck is such as to permit uncoupling of the truck from the trailer train without unloading the trailer disposed on the truck, whereby said load may be transported when disconnected from the trailer train into cars or wagons as desired. The arrangement of the truck and trailer relative to each other is such that the trailer and truck may be maneuvered in a small space such as a railroad car. This arrangement permits the maneuvering of a motor truck and a trailer within a car or along freight platforms within spaces which heretofore have been inadequate for the passage of a truck and a trailer, when the trailer was coupled to the truck and not carried thereby.

My invention thus provides an arrangement of a self-propelled truck and a load carrying trailer, whereby a series of trailers may be made up in a train which may be moved along a loading platform, for instance, such a platform as is usually adjacent a railroad switch, the arrangement of the trailers within the train being dependent upon the destination of the freight which is carried thereby and the location of the various freight cars, on the railroad switch, which are scheduled for said destination.

As shown in Figs. 1 and 2, an industrial truck A is operated by the driver who is positioned upon control platforms 8 attached to the forward end of the truck adjacent the various mechanisms which control a motor propelling the truck, and a motor which operates an elevating platform 9 positioned on the rear part of the truck. The load lifting platform 9 serves as a coupling means for engaging and completely lifting the first trailer B of the trailer train clear of the terminal platform. A suitable coupling mechanism C is provided which will permit the elevating of the trailer B while maintaining the second trailer D of the train in coupled relation with the first trailer B. Coupling mechanisms C are provided on all the trailers and are operated in a manner which will be hereinafter described.

In carrying out the steps in my method of handling freight, the operator will drive the truck and train along a loading platform P, Fig. 3, until the train is adjacent the door of a car E which is to receive the contents carried by the first trailer B. The tractor may then be backed up slightly and the coupling mechanism C, which is controlled from the driver's position, may then be operated to uncouple the trailer B from the train, while being maintained upon the truck. The truck may then carry the trailer directly into the car F and deposit the loaded trailer adjacent the end of the car which is being loaded with merchandise. The truck may then be driven out of the car and caused to engage the second loaded trailer D by raising it and thereby couple the truck once more to the trailer train. The driver may then proceed to the next car which is to receive the freight contents of the trailer D, etc.

If two or three of the trailers are to be unloaded in one car, the operator may leave his position on the truck, uncouple the third trailer from the train and transport the trailer B with the following trailers D and E into the car and then proceed to transport the remainder of the trailer train to the proper car or cars. It will thus be seen the truck and the trailers may be maintained in constant use. A man may remain in each car to unload the freight from the trailer and thereby properly pack it in the car; the trailers may then be manually drawn from the car by the man working therein and be positioned in coupled relation on the platform whereby the truck on its return trip may readily pick up the empty trailers.

If desired, the railroad cars may be loaded and unloaded at the same time, in which case after one of the trailers which has been deposited in the car with freight thereon has been unloaded by the man in the car, the trailer may then be drawn to the opposite end of the car and loaded with incoming freight. The trailer would then be transported out of the car by the truck or if the load were light, it would be manually drawn out of the car and positioned on the platform awaiting the return of the truck.

In Fig. 3, the loaded trailer train T is shown uncoupled from the truck A; the truck A is shown entering the car F to deposit the loaded trailer B adjacent the right end of the car. An empty trailer K is shown positioned adjacent the other end of the car to receive incoming freight which is being unloaded from the same car. In the railroad car E adjacent the car F, is a deposited trailer J, the contents of which are to be unloaded in that car. An empty trailer train is shown at R awaiting the return of the track A after the trailers comprising the loaded train T have been deposited in the various cars. A truck having the general characteristic of an industrial platform lifting truck such as is disclosed in the Cochran Patent, No. 15,497, reissued November 28th, 1922, would be adaptable to my present method of handling freight. In that patent is disclosed a load elevating platform and mechanism therefor, the platform being disposed over small steering wheels adjacent the rearward portion of the truck; the disposition of the load receiving platform being such that the truck may be positioned under an elevated platform supporting a load and thus raise the platform and load or deposit it, as desired.

I show the arrangement of the trailer platform and wheels attached thereto relative to the load lifting platform of the truck, when the trailer is lifted by the truck platform, in Figs. 4, 5 and 6. As shown in Fig. 5, the trailer platform 10 is of sufficient width to span a load elevating platform 11 of the truck A. The load elevating platform may be provided with suitable lugs, not shown, which engage the channel members 50 and thus prevent the dislodging of the trailer when the draw bar pull is transferred from the truck A to the trailer train coupled thereto.

The coupling mechanism between the trailers may comprise a draw bar 13 pivotally attached to an extension 14 of the trailer by a bracket 15, the relation of the bracket and draw bar being such as to limit the swinging movement of the draw bar 13, while permitting an elevating movement of the trailer by the truck. The free end of the draw bar 13 is provided with a downwardly extending hooked portion 16 and an opposed lug 17 which engage a U-bolt 18 attached to a rear extension 19 of the trailer platform. The portion 16 of the draw bar engages the U-shaped member when the truck is being driven forwardly while the lug portion maintains the draw bar in coupled relation to the trailer, if it is desired to back the truck slightly to relieve the draw bar pull when uncoupling. To enable the truck operator to uncouple the trailer train from the trailer, which is deposited upon the truck platform, I have provided a loop member 20 somewhat in the shape of a bale which is pivotally mounted on the rear of the truck to swing upwardly into contact with the draw bar and act upon the under side thereof to raise it out of engagement with the U-shaped coupling member 18.

A convenient mechanism to uncouple the trailer and which may be manipulated from the operator's position on the truck, may comprise a crank 22 (see Fig. 2) attached to the side of the truck, a cable drum 23 and a cable 24 extending from the forward to the rearward end of the truck adjacent the coupling mechanism and which may be guided over suitable sheaves or pulleys in any convenient manner. The rear end of the cable is wound upon a spring actuated drum 25. The rear cable drum 25 is mounted upon a small shaft 26 suitably attached to the truck elevating platform 9. Adjacent the drum 25 is a pinion 26 which acts upon a gear 27 rigidly mounted on a transverse portion 20ª of the uncoupling bale 20. A torsion spring 28 may be positioned coaxially on the small shaft 26 and acts to turn the gear 27 to normally swing the bale 20 to the dot and dash position illustrated in Fig. 4. Thus, when it is desired to uncouple the trailer D from the trailer B, the operator may turn the crank arm 22 and cause the bale 20 to swing from its position beneath the rearward end of the truck outwardly and upwardly and raise the draw bar 13 out of engagement with the trailer on the truck. A lock pin 40 may be suitably mounted to close the hook on the draw bar. This pin may be acted upon by a weighted lever 41 which is mounted on the draw bar and which is acted upon by the bale 20.

From the foregoing description, it will be understood that I provide a method of handling merchandise at railway terminals, warehouses, etc., wherein I make efficient use of an industrial truck and a plurality of trailers for transporting and positioning freight in the various predestined railroad cars necessitating only the employment of an operator for the truck in moving a large amount of freight. The various freight handlers may remain in the respective freight cars in which they are packing freight and thus devote undivided attention to the proper packing, loading and unloading of the freight to and from the trailers. It will be apparent that since the movement of freight when on the trailers is determined by the speed at which the operator drives the truck and manipulates the same and not by the speed at which a freight handler could otherwise move the freight along the platform and into the car manually, an appreciable saving in time and labor is effected.

Furthermore, a distinct advantage is obtained over the old method where a tractor was connected to a plurality of trailers and an extra operator or brakeman was carried on the rear of the train to detach the last trailer of the train adjacent to its unloading position, in that a saving is effected in the labor cost of handling the freight as the train in the present instance is handled by only the operator of the truck. Likewise, by making up the trailer train so that the first trailer to be detached from the train is adjacent the truck and not at the end of the train, it is possible for the operator to detach that trailer from the train while the trailer remains on the truck and the trailer may be transported directly into the freight car with the load preceding the operator, as distinguished from the old method where the trailer would be drawn into the car by a tractor. It will be readily seen that this arrangement permits the operator to deposit the trailer within the car immediately adjacent the loading end thereof and drive the truck out of the car without any maneuvering to pass the deposited trailer. This feature of having the trailer precede the truck into the car, I consider to be one of the distinctive features in my system of handling freight.

I claim:—

1. The method of handling freight which includes the steps of making up a train of small trailers of convenient size to be drawn by an industrial truck, coupling a tractor thereto, comprising a platform lifting truck, by raising the first trailer of the train upon the elevating platform of the truck while the trailer remains coupled to the train, transporting the train to the railroad freight loading location of the contents of the first trailer, disconnecting the truck from the train while maintaining said first trailer upon the truck platform, transporting said freight while upon the trailer to the trailer unloading position, depositing the trailer with the freight thereon, returning the truck to the train, and repeating the coupling operation by engaging the then first trailer of the train in the manner described in the first step.

2. The method of handling freight which includes loading trailers while in uncoupled relation, each trailer being loaded with freight packages having a common destination, coupling the trailers together to form a trailer train, engaging the end trailer of the train with a platform lifting truck by positioning the trailer upon the truck while the trailer remains coupled to the trailer train, transporting the train to the loading places of the freight carried by the trailer on the truck, uncoupling the trailer from the train, transporting the trailer out of its train relation to the remainder of the coupled trailers depositing the trailer, engaging the next trailer of the trailer train by raising it upon the truck, and transporting a train to the unloading place of the freight carried by the second trailer.

3. The method of handling freight which includes the steps of loading individual trailers with package freight, the freight of each trailer having a different destination, arranging the trailers in a train according to the freight content thereof and whereby the trailers may be uncoupled from the train successively, transporting the train to various railroad cars having destinations corresponding to the destinations of the freight carried on the trailers uncoupling the trailers in order, transporting the trailers into railroad cars, depositing the trailers in the respective cars, returning to the trailer train after disposition of each trailer, and coupling the train to the truck by elevating an end trailer thereof upon the truck while the trailer remains coupled to the train.

4. The method of handling freight at terminals, warehouses and the like, which includes the steps of transporting a trailer train, the individual units of which carry freight having a common destination to successive points of trailer unloading positions, by carrying the first unit thereof upon an elevating platform truck while said unit remains coupled to the train, and depositing the trailers successively corresponding to the various destinations of the freight carried by the trailers.

5. The method of handling freight which includes the steps of loading individual trailers with freight, arranging the trailers in a train whereby the trailers may be uncoupled from the forward end of the train successively, transporting the train to various locations by elevating the first trailer of the train upon a platform lifting truck and exerting the draw bar pull through said elevated trailer, uncoupling the trailers in order while maintaining the uncoupled trailer on the elevating platform truck, transporting the trailer into a freight receiving vehicle, depositing the trailer therein, returning the truck to the trailer train after disposition of each trailer, repeating said trailer coupling operation and transporting the train to another trailer unloading position.

6. The method of handling freight which includes the steps of transporting a trailer train by elevating the first trailer of the train upon a load lifting platform truck of the self-propelled type, transporting the train to successive points of trailer unloading positions, uncoupling the train from the truck while retaining the first trailer thereof upon the truck, transporting said trailer while on the truck to its immediate unloading position, and depositing said trailer at said position.

7. The combination of an industrial truck of the character described, a trailer therefor, the frame of the trailer being arranged to permit superposing thereof upon the load elevating platform of the truck, a second trailer, coupling means connecting the two trailers and means carried by the truck and controlled from the operator's position thereon, and arranged to act upon said coupling means whereby said trailers may be uncoupled.

8. An apparatus for handling freight, comprising an industrial truck of the elevating platform type, a trailer having the frame thereof arranged whereby the trailer may be superposed upon the truck platform, a plurality of trailers having similar frame characteristics in coupled relation and connected to said first named trailer when in elevated position upon the truck, a coupling mechanism common to and carried by all of the trailers and means carried by the truck and controlled from the operator's position thereon, for acting upon the coupling mechanism connecting the trailer on the truck to the second trailer, whereby the truck and said trailer may be disconnected from the trailer train while the operator remains in position on the truck.

9. In an apparatus for handling freight, the combination of a self-propelled industrial truck of the platform elevating type, a plurality of trailers having the frames thereof arranged whereby each trailer may be engaged by the truck platform and elevated thereupon, a coupling mechanism for each trailer arranged to permit elevation of the first trailer of the trailer train upon the truck, while remaining in coupled relation to the trailer train and means controlled from the operator's position on the truck for causing the coupling mechanism between the first and second trailer to be disengaged from one of the trailers.

10. An apparatus for handling freight, comprising an industrial truck of the elevating platform type, a trailer having the frame thereof arranged whereby the trailer may be superposed upon the truck platform, a plurality of trailers, having similar frame characteristics, in coupled relation and connected to said first named trailer when in elevated position upon the truck, each trailer having a coupling mechanism and means for swinging the coupling mechanism to an upright position when in uncoupled relation to a preceding trailer.

11. In an apparatus for handling freight, the combination of a self-propelled industrial truck of the platform elevating type, a plurality of trailers having the frames thereof, arranged to be readily engaged by the truck platform and elevated thereupon, and a coupling mechanism for each trailer, whereby the first trailer of the trailer train may be elevated upon the truck, while remaining in coupled relation to the trailer train.

In testimony whereof, I hereunto affix my signature.

CLEO BRENTON COOK.